(12) United States Patent
Dickel et al.

(10) Patent No.: US 7,413,655 B2
(45) Date of Patent: Aug. 19, 2008

(54) METHOD FOR THE BIOLOGICAL BREAKDOWN OF EFFLUENT CONTAINING NITROAROMATICS

(75) Inventors: Olaf Dickel, Gerlingen (DE); Hans-Joachim Knackmuss, Leonberg (DE); Paul-Gerhard Rieger, Stuttgart (DE)

(73) Assignee: Universitat Stuttgart, Stuttgart (DE)

( * ) Notice: Subject to any disclaimer, the term of this patent is extended or adjusted under 35 U.S.C. 154(b) by 490 days.

(21) Appl. No.: 11/302,953

(22) Filed: Dec. 14, 2005

(65) Prior Publication Data

US 2006/0115887 A1    Jun. 1, 2006

Related U.S. Application Data

(63) Continuation of application No. PCT/EP2004/007128, filed on Jun. 30, 2004.

(30) Foreign Application Priority Data

Jul. 11, 2003    (DE) ................ 103 31 507

(51) Int. Cl.
*C02F 3/00*    (2006.01)
(52) U.S. Cl. ............... 210/610; 210/909; 435/262.5
(58) Field of Classification Search ........... 210/610, 210/611, 909; 435/262.5
See application file for complete search history.

(56) References Cited

U.S. PATENT DOCUMENTS

| | | | |
|---|---|---|---|
| 5,455,173 A | 10/1995 | Crawford et al. ........ 435/264 |
| 5,478,743 A | 12/1995 | Perkins et al. ........ 435/262.5 |
| 5,543,324 A | 8/1996 | Rajan et al. ........ 435/252.4 |
| 5,618,427 A * | 4/1997 | Seech et al. ........ 210/602 |
| 6,066,772 A * | 5/2000 | Hater et al. ........ 71/64.08 |
| 6,334,954 B1 * | 1/2002 | Crawford et al. ........ 435/262.5 |
| 6,475,387 B1 | 11/2002 | Ouazzani et al. ........ 210/601 |
| 6,699,707 B1 * | 3/2004 | Hince ........ 435/262 |

FOREIGN PATENT DOCUMENTS

WO    2005/007587    1/2005

OTHER PUBLICATIONS

International Search Report and Written Opinion; Application No. PCT/EP2004/007128, 2004.
Melgoza et al.; "Degradation of p-nitrophenol in a batch biofilter under sequential anaerobic/aerobic environments"; *Water Science and Technology*; vol. 44, No. 4, pp. 151-157; 2001.
Zhao et al.; "Microbial degradation of nitrobenzene and mono-nitrophenol by bacteria enriched from municipal activated sludge"; *Canadian Journal of Microbiology*; 1999.
International Report on Patentability, Application No. PCT/EP2004/007128, 2004.

* cited by examiner

*Primary Examiner*—Chester T. Barry
(74) *Attorney, Agent, or Firm*—Renner, Otto, Boisselle & Sklar, LLP

(57) ABSTRACT

A method for the biodegradation of nitroaromatic-containing wastewater, including:
(a) providing activated sludge as biological matrix,
(b) adding a nitroaromatic-degrading microorganism to the activated sludge,
(c) adding nitroaromatic-containing wastewater to the material of step (b) and
(d) adding at least one carbon source which is more readily utilizable than the nitroaromatic to be degraded to the material of step (c).

11 Claims, No Drawings

METHOD FOR THE BIOLOGICAL BREAKDOWN OF EFFLUENT CONTAINING NITROAROMATICS

CROSS-REFERENCE TO RELATED APPLICATION

The present application is a continuation of and claims priority under 35 U.S.C. §120 and §365(c) to International Application No. PCT/EP2004/007128, filed 30 Jun. 2004, which in turn claims priority to German Application No. 103 31 507.1, filed 11 Jul. 2003, the entire disclosures of both of which are fully incorporated by reference herein.

TECHNICAL FIELD

The present invention relates to a method for the biodegradation of nitroaromatics-containing wastewaters, in particular those having a high nitrogenous salt loading, such as occur, for example, in the context of nitrobenzene production.

BACKGROUND

Nitrobenzene is one of the most important industrial chemicals with an annual global production of more than 2 million tonnes. In the USA alone, in 2001 more than 1.5 million tonnes of nitrobenzene were synthesized and the production since 1990 was more than doubled. In Germany, for example, in the Uerdingen Bayer works, there is a nitrobenzene plant having a production capacity of approximately 300 000 tonnes per annum; see press information Bayer AG, 30.01.2002. About 97% of the nitrobenzene produced globally is used for the production of aniline.

Nitrobenzene is synthesized by nitrating benzene using "nitrating acid" ($HNO_3+H_2SO_4$). Approximately 0.1% of the benzene consumed arises as a result of the synthesis in the form of byproducts and thus as production wastewater. This wastewater contains, as main components, 2,4-dinitrophenol and picric acid (2,4,6-trinitrophenol) and also customarily a high loading of nitrogenous and sulfur salts; see Rajan J., R. Perkins and S. Sariaslani 1994, "Microbial degradation of picric acid", Abstr. Q-121, p. 409. Abstr. 94$^{th}$ Ann. Meet. Am. Soc. Microbiol. 1994, and also Patil S. S. and V. M. Shinde, "Gas chromatographic studies on the biodegradation of nitrobenzene and 2,4-dinitrophenol in the nitrobenzene plant wastewater", Environ. Pollut. 57, 1989, 235-250.

Nitrophenol compounds have a high toxic potential. This applies in particular to 2,4-dinitrophenol, the main impurity of the wastewaters customarily occurring in the production of nitrobenzene, particularly because of its decoupling action on respiratory chain phosphorylation; see Pinchot G. B., "The mechanism of uncoupling of oxidative phosphorylation by 2,4-dinitro-phenol", J. Biol. Chem. 242, 1967, 4577-4583. Therefore, the synthesis wastewaters which occur must be fed to appropriate disposal methods. Currently four methods are used for this:

(a) the Deep Sea Dumping Method in which the problem materials are finally deposited in the deep sea, (b) the Deep Well Injection Method, in which the wastes are fed by an injection method to sites in deep layers in the earth where they are not a hazard to groundwater, (c) the thermolysis method in which the wastewater is thermally decomposed at approximately 280° C. at high pressure (see U.S. Pat. No. 5,232,605), and (d) the ozonation method in which the wastewater is treated with ozone at temperatures between 60 and 100° C. under elevated pressure (see U.S. Pat. No. 6,245,242).

However, in the Deep Sea Dumping Method and the Deep Well Injection Method, the wastes are merely finally deposited. In contrast, although the thermolysis method and the ozonation method are efficient in the disposal result, because of the necessary process procedure (temperature, pressure, use of ozone) they represent an immense cost factor within the overall nitrobenzene production method. In the thermolysis method, in addition it requires additionally increased safety precautions.

SUMMARY

The object therefore underlying the present invention is to provide a method which is to be an inexpensive and environmentally acceptable alternative to the currently known methods and is to enable essentially complete elimination of nitroaromatics from corresponding synthesis wastewaters.

This object is achieved by the embodiments of the present invention which are characterized in the claims.

In particular, a method is provided for the biodegradation of nitroaromatics from wastewaters, in particular those having a high nitrogenous salt loading, as customarily occur in the context of nitrobenzene production, which comprises the following steps:

(a) providing activated sludge as biological matrix, (b) adding nitroaromatics-degrading microorganisms to the activated sludge, (c) adding nitroaromatics-containing wastewater to the material of step (b) and (d) adding at least one carbon source which is more readily utilizable than the nitroaromatics to be degraded to the material of step (c), for nitrogen limitation, the molar ratio of dissolved carbon/nitrogen being set to a value in the range $\geq 8:1$.

The inventive method permits in a particularly inexpensive and environmentally acceptable manner an essentially complete elimination of nitroaromatics from corresponding synthesis wastewaters, as occur, in particular, in the context of nitrobenzene production.

DETAILED DESCRIPTION

It is known that specific microorganisms or bacterial strains, for example those of the genus *Rhodococcus*, are suitable for degrading nitroaromatics from corresponding wastewaters. However, if these micro-organisms are cultured in a pure culture in a fermenter using the nitroaromatics as sole substrate over a relatively long time, this system, however, destabilizes itself in the course of time, as toxic nitrite accumulates, with the consequence that continuous fermentation is not possible. This is due to the carbon/nitrogen ratio which is unfavorable for the microorganisms when the nitroaromatics are available as sole carbon and nitrogen source. In addition, under these conditions, cell aggregation is observed.

It has now surprisingly been found that just the combination of activated sludge with nitroaromatics-degrading microorganisms leads to a self-stabilizing effective system for the biodegradation of nitroaromatics-containing wastewaters, in particular wastewaters from nitrobenzene production having high salt loading, when, simultaneously, the addition of at least one more readily utilizable carbon source is further provided. This additional carbon source fulfils two tasks: it leads to the biological diversity of species being obtained and it leads to a targeted nitrogen limitation when it is fed in an appropriate concentration. The nitrogen limitation forces the organisms to use the nitroaromatics as nitrogen source. Furthermore, in the inventive method, no contamination problems occur, since no pure culture is used, whereas the natural biological diversity of species of the activated sludge matrix contributes to the stability of the system. This leads to a great advantage compared with methods using pure special cultures.

By adding an additional more readily utilizable carbon source, the ratio of dissolved carbon/nitrogen in the fermenter can be matched to the requirement of the microorganisms. The wastewaters of nitrobenzene production, in addition to the nitroaromatics, customarily contain high concentrations of nitrogenous inorganic salts, e.g. nitrite, nitrate and ammonium salts. As a result, there is an excess of nitrogen. The organisms are not forced to cover their own nitrogen requirement by degrading the nitroaromatics. Therefore, this imbalance needs to be reversed, and thus nitrogen limitation introduced, by feeding one or more readily utilizable carbon sources. The microorganisms then degrade the nitroaromatics and release the nitrogen which is contained. In addition, the nitrogen limitation prevents the nitroaromatics-degrading microorganisms from being displaced from the activated sludge by other organisms, because only via the nitroaromatics-degrading microorganisms can the nitrogen supply of the overall population be ensured.

The inventive method is thus based on the combination of the following aspects:
  (a) use of bacterial (starter) cultures which can degrade the nitroaromatics to be eliminated (in the exemplary embodiment, 2,4-dinitrophenol and 2,4,6-trinitrophenol);
  (b) additional use of activated sludge for degrading the wastewater consisting of many nutrients, as a result of which a biological diversity and flexibility of the system is achieved, by means of which also toxic degradation products such as nitrite, in addition to further constituents of the industrial wastewater can be eliminated; and
  (c) introduction of a strict nitrogen limitation; this is achieved by "feeding" carbon sources which make possible the survival of a multiplicity of micro-organisms, as a result of which a biological diversity is achieved with the simultaneous obligation to utilize the nitroaromatics for their own nutrition.

In the context of the present invention, the expression "activated sludge" denotes in this case the biomass formed in aerobic biological wastewater purification by degradation of the wastewater constituents (in the "activation" tank) together with its inorganic and organic fractions, which biomass essentially consists of bacteria, fungi, protozoa, rotifers and nematodes. The activated sludge is generally present in the form of flocks which, in addition to live and dead biomass, also contain absorbed and incorporated organic and mineral fractions. Activated sludge flocks, in the ideal case, consist of a brownish mineral core in which anaerobic conditions prevail, and of a biologically active aerobic gray rim zone of microorganisms. The activated sludge which is used as biological base matrix in the inventive method can originate, for example, from a municipal sewage treatment plant.

Microorganisms or bacterial strains provided in the inventive method are capable of growing using nitroaromatics as nitrogen source, i.e. they possess the necessary degradation potential for nitroaromatics. Those skilled in the art are able to select, from the multiplicity of possible microorganisms, those which are suitable for the defined task, that is the degradation of nitroaromatics. The corresponding microorganisms can be selected by those skilled in the art from strain databanks or by suitable isolation from nature. The nitroaromatics-degrading microorganisms can be selected, for example, from *Nocardioides* sp. (e.g. DSM No. 12746), *Burkholderia* sp. (e.g. DSM Nos. 8530 and 12775), strains of the genus *Rhodococcus*, as, in particular, *Rhodococcus koreensis* (e.g. DSM No. 44498), and *Arthrobacter* sp. (e.g. ATCC Nos. 55546, 55547, 55548 and 55549). Preferably, the nitroaromatics-degrading bacterial strains are capable of degrading nitrophenols, i.e. mono-, di- and/or trinitrophenols, particularly preferably 2,4-dinitrophenol and/or picric acid.

The nitroaromatics-containing wastewater preferably originates from nitrobenzene production and customarily has a high salt loading. The salt loading customarily contains essentially nitrogen salts such as nitrite, nitrate and ammonium salts, which in turn are sources of nitrogen which are more readily utilizable than the nitroaromatics to be degraded. In the context of the inventive method, it is advantageous to acclimatize the starting biocenosis, which is made up of activated sludge and the nitroaromatics-degrading microorganisms, successively to the components of the nitroaromatics-containing wastewater. Customarily, from the start attention is paid to strict nitrogen limitation, i.e. a carbon source which is more readily utilizable for the biological culture is added. The term "biocenosis" here denotes the symbiosis of all microorganisms in this system which are dependent on one another and interact with the inactivated environment.

The biomass used in the inventive method can be immobilized or fixed to a support in accordance with customary methods. This generally permits, with maintenance as far as possible of its biological activity, a substantially improved mixture with the wastewaters to be treated, and a substantially facilitated separation and recirculation of the biomass or biocatalysts from the treated wastewaters.

The nitroaromatics to be degraded in the context of the inventive method are preferably nitrophenols, such as mono-, di- or trinitrophenols, particularly preferably 2,4-dinitrophenol and/or picric acid, which can be present in the wastewater, in particular that from nitrobenzene production, in different quantitative ratios.

With respect to the term "carbon source which is more readily utilizable than the nitroaromatics to be degraded", it may be pointed out that a substance is regarded as poorly degradable when it cannot be simply recirculated by bacteria to natural metabolic cycles. This relates, for example, to nitroaromatics. However, bacteria require a carbon source for their metabolism and their growth. If these bacteria have problems with utilizing the nitroaromatics as carbon source, they require a different carbon source, i.e. a "more readily utilizable or convertible carbon source". The more readily utilizable carbon source which is additionally added to the system in the context of the inventive method is thus more readily biologically utilizable than the nitroaromatics to be degraded of the wastewater to be treated. The concentration of the additional carbon source is selected in such a manner that a strict nitrogen limitation is achieved for the microorganisms in the substrate overall balance. For this, the molar ratio of dissolved carbon/nitrogen in the context of the inventive method is set to a value in a range $\geq 8:1$, preferably $\geq 20:1$. Suitable readily utilizable carbon sources are, for example, sugars, such as glucose or fructose, sugar alcohols, such as mannitol or sorbitol, starch, paraffins, aliphatic alcohols, carboxylic acids and mixtures thereof. In the same manner, production wastewaters containing starch, protein or other carbon sources are suitable as more readily utilizable carbon source. Preferably, sugars, in particular glucose, fructose or a mixture thereof, are used.

The inventive method is customarily carried out at a temperature of 10 to 35° C., preferably between 15 and 30° C. In addition, the inventive method is customarily carried out at a pH of between 5.5 and 10.0, preferably between 6.5 and 8.0. Depending on the conditions specifically present, the hydraulic residence time (sludge age) in the fermenter is customarily 2 to 21 days, preferably 4 to 14 days.

By means of the inventive method, it is possible to biodegrade nitroaromatics from wastewaters, in particular wastewaters of nitrobenzene production, completely in continuous operation. The inventive method, compared with known methods in the prior art, is less expensive, more effective and more environmentally acceptable.

The inventive method will be illustrated hereinafter by an example, without restricting the present invention thereto.

EXAMPLE

A laboratory fermenter (volume: 2 liters) equipped with agitator, feed air control and pH monitoring was operated in the continuous chemostat method. By means of a metering pump, a synthetic wastewater which is equal in composition to a customary wastewater in the context of nitrobenzene production was fed to the fermenter. Via a level controller, excess culture volume was drawn off by suction from the fermenter via a second pump. The activated sludge from a municipal sewage treatment plant was enriched with precultures of *Rhodococcus opacus* ("PAM") and *Rhodococcus koreensis* ("PAP1"). When these biological cultures were brought together with the synthetic wastewater, from the start, attention was paid to strict nitrogen limitation, i.e. a carbon or energy source readily utilizable by the biological cultures, preferably a mixture of glucose and fructose in the ratio of 1:1, was added. In this case, a concentration ratio between dissolved total carbon content/dissolved total nitrogen content of $\geq 8:1$, more preferably $\geq 20:1$, based on the molar ratio, was set or controlled, in order to maintain constantly the strict nitrogen limitation for the microorganisms in the "culture broth". Depending on nitrogen content of the medium, up to 200 mm glucose/fructose 1:1 were added to the substrate mixture.

The feed of the wastewater components was performed on the base of a buffered mineral medium of the following composition (made up to 1 liter):

| | | |
|---|---|---|
| $Na_2HPO_4 \cdot 12H_2O$ | 7 | g |
| $KH_2PO_4$ | 1 | g |
| $CaCl_2 \cdot 2H_2O$ | 5 | mg |
| Fe(III) citrate | 2 | mg |
| $MgSO_4 \cdot 7H_2O$ | 20 | mg |

In an adaptation phase, the starting biocenosis was successively acclimatized to the components of the synthetic wastewater. The pH desired in each case in the fermenter culture was set using $H_3PO_4$ or NaOH respectively.

In the table hereinafter, the concentration ranges of the relevant wastewater components of the wastewater to be treated are listed.

TABLE 1

| Component | Concentration range (mm) | Corresponding max (ppm) |
|---|---|---|
| Picric acid | 0-20 | 4380 |
| 2,4-Dinitrophenol | 0-20 | 3680 |
| $NaNO_2$ | 0-20 | 1380 |
| $NaNO_3$ | 0-2 | 170 |
| $(NH_4)_2SO_4$ | 0-1 | 132 |

The synthetic wastewater contained a picric acid concentration of a maximum of 4380 ppm, which is significantly above the differing literature data of picric acid concentration for wastewaters occurring from nitrobenzene synthesis (65 to 2500 ppm). Optionally, the synthetic wastewater to be treated contains a 2,4-dinitrophenol concentration of a maximum of 4380 ppm, which is likewise above the 2,4-dinitro-phenol concentration for a customary wastewater (300 to 2800 ppm). To take into account the nitrogen salts present in a wastewater occurring from nitrobenzene synthesis, in addition different concentrations of nitrite, nitrate and ammonium were admixed in the substrate feed of the fermenter. To simulate fluctuations in the composition of the nitroaromatics fractions and salt loadings of customary synthesis wastewaters of nitrobenzene production, use was made of different mixing ratios of these components as substrates (see above Table 1). In addition, stable chemostat ratios for differing residence times (sludge age) were determined. In the above-described exemplary embodiment, a constant degradation performance of the biocenosis was established at an optical density (546 nm) of approximately 30, corresponding to a biomass dry weight of 9 g/l.

The inventive method is thus suitable for eliminating, for example, the concentration ranges reproduced in Table 1 of the components of a synthesis wastewater of nitrobenzene production. In the fermenter effluent, no substrates or known transformation products of nitrophenols were detectable by means of HPLC analysis. The residual COD (COD=chemical oxygen demand) in the fermenter effluent is completely degraded by conventional activated sludge and can thus be fed to a corresponding activated sludge method. Even after continuous operation for one year, the degradation process and the biocenosis were found to be stable.

The invention claimed is:

1. A method for the biodegradation of nitroaromatic-containing wastewater, comprising:
   (a) providing activated sludge as biological matrix,
   (b) adding a nitroaromatic-degrading microorganism to the activated sludge,
   (c) adding nitroaromatic-containing wastewater to the material of step (b) and
   (d) adding at least one carbon source which is more readily utilizable than the nitroaromatic to be degraded to the material of step (c), the molar ratio of dissolved carbon/nitrogen being set to a value in the range $\geq 8:1$.

2. The method as claimed in claim 1, wherein the adding at least one carbon source is for nitrogen limitation.

3. The method as claimed in claim 1, wherein the temperature is kept between 10 and 35° C., and the pH between 5.5 and 10.0.

4. The method as claimed in claim 1, wherein the nitroaromatic comprises one or more nitrophenol and the nitroaromatic-degrading microorganism degrades the one or more nitrophenol.

5. The method as claimed in claim 4, wherein the one or more nitrophenol comprises a monophenol, a diphenol, a triphenol, or a mixture of two or more thereof.

6. The method as claimed in claim 4 wherein the one or more nitrophenol comprises 2,4-dinitrophenol, picric acid or both 2,4-dinitrophenol and picric acid.

7. The method as claimed in claim 1, wherein the more readily utilizable carbon source comprises a sugar, a sugar alcohol, a paraffin, an aliphatic alcohol, a carboxylic acid, a starch, a protein and mixtures of any two or more thereof.

8. The method as claimed in claim 7 wherein the sugar comprises glucose, fructose or a mixture thereof.

9. The method as claimed in claim 1 wherein the wastewater further comprises a nitrogenous salt.

10. The method as claimed in claim 9 wherein the nitrogenous salt comprises one or more of a nitrite salt, a nitrate salt and an ammonium salt.

11. The method as claimed in claim 1, wherein the wastewater originates from nitrobenzene production.

* * * * *